United States Patent Office 2,810,687
Patented Oct. 22, 1957

2,810,687

REACTION OF THIOLS WITH OLEFINES

Walter H. C. Rueggeberg, United States Army, and Walter A. Cook, Akron, Ohio, assignors to the United States of America as represented by the Secretary of War, as trustee No Drawing. Application June 4, 1945,
Serial No. 597,492

3 Claims. (Cl. 204—158)

(Granted under Title 35, U. S. Code (1952), sec. 266)

The invention described herein may be manufactured and used by or for the Government for governmental purposes without the payment to us of any royalty thereon.

This invention relates to organic compounds and a process for preparing same. More specifically it relates to the process for preparing thio alkanes by reacting thiol with an olefine particularly wherein the reaction is promoted by a catalytic substance.

One of the objects of this invention is to utilize a promoter such as phenyl disulfide ($C_6H_5$—S—S—$C_6H_5$) for the addition of thiols to olefines, particularly for the addition of ethanedithiol (H—S—$CH_2CH_2$—S—H) to vinyl chloride ($CH_2$=CHCl).

Another object of this invention is to effect the combination of mercaptans and olefines by means of a light source, which is energetically lower than that emitted by a mercury ultraviolet lamp.

Another object of this invention is to increase the rate of reaction by suitable means which are readily available and less expensive than the ones used heretofore for the same purpose.

Still another object of this invention is to make possible the addition of a mercaptan to an olefin at temperatures ranging from 0° C. to 50° C. in the manufacture of large quantities of the desired reaction product.

The promoters heretofore used in similar reactions had several disadvantages, such as low yields, slowness of reaction unless ultra-violet light was also used and the necessity of special treatments for the end products desired. Also the use of ultra-violet light entailed several difficulties including the necessity of special reaction vessels.

All these and other disadvantages have been eliminated almost entirely by practicing the present invention.

For a better understanding of the nature and scope of the invention, reference may be had to the following detailed description thereof wherein a number of specific embodiments are set forth involving the addition of ethanedithiol (HS—$CH_2$—$CH_2$—HS) to vinyl chloride ($CH_2$=CHCl).

The reaction involved may be represented by the following equation:

$$\text{H—S—CH}_2\text{CH}_2\text{—S—H} + 2\text{CH}_2\text{=CHCl} \xrightarrow[\text{Phenyl disulfide}]{\text{Light}}$$

ClCH$_2$CH$_2$—S—CH$_2$—CH$_2$—S—CH$_2$CH$_2$Cl

Bis (2-chloroethylthio) ethane-1,2

The following example is given as one of the embodiments of this invention:

Example I 2.266 parts by weight of ethanedithiol and 5.0 parts by weight of liquid vinyl chloride together with 0.023 part by weight of phenyl disulfide (1% by weight based upon ethanedithiol) are sealed in a Pyrex reaction vessel suitable for the irradiation of its contents by either external or internal light sources. The reaction vessel must be capable of withstanding an internal pressure of 100 lb. per inch. For maximum efficiency of the process, a layer of water 3 cm. or greater in thickness and at a temperature of 20–30° C. is interposed between the light source and reaction vessel. This procedure serves to filter infra red radiation out of the radiant energy of the light source. The length of irradiation periods varies from 2 to 90 minutes, depending on the light source.

The results of a number of runs conducted as described in the preceding sections, are given in the accompanying table.

| Promoter | Light Source | Irradiation Time in Min. | Conversion, Percent |
|---|---|---|---|
| Phenyl Disulfide | 500 Watt Mazda, Tungsten filament lamp with frosted glass envelope. | 5 | 50.8 |
| Do | do | 10 | 86.5 |
| Do | do | 15 | 92.2 |
| Do | same, but 300 Watt | 5 | 18.8 |
| Do | do | 15 | 56.8 |
| Do | do | 30 | 88.6 |
| Do | same, but 150 Watt | 10 | 7.7 |
| Do | do | 20 | 39.6 |
| Do | do | 60 | 66.5 |
| Do | same, but 60 Watt | 10 | 5.0 |
| Do | do | 40 | 8.6 |
| Do | do | 60 | 65.3 |
| Do | same, but 15 watt | 30 | 0.3 |
| Do | do | 60 | 0.6 |
| Do | do | 90 | 1.5 |
| Do | 100 Watt S-4, Hg Vapor lamp. | 2 | 89.6 |
| Do | do | 5 | 97.8 |
| Do | do | 10 | 99.6 |
| For comparison: | | | |
| Amyldisulfide | 500 Watt Mazda | 5 | 1.0 |
| Do | do | 10 | 1.9 |
| Do | do | 20 | 2.6 |

These results indicate that rather costly ultraviolet light sources are not needed in order to effect the combination between ethanedithiol and vinyl chloride. The Mazda lamps used were of the ordinary household variety.

These results also indicate that if a Hg lamp is used, the reaction rate in the presence of 1% phenyldisulfide is enhanced to such a degree that the combination between the mercaptan and the olefin is virtually instantaneous.

Seventeen other disulfides were investigated (including amyl disulfide, given in table, above) with the result that all were found to be inferior to phenyl disulfide in 1% concentration. An aromatic disulfide such as naphthyl disulfide was found to approximate the activity of phenyl disulfide.

The process of this invention may be carried out in the presence of inert solvents, such as benzene, cyclohexane, or methanol.

Methanol appears to be the preferred solvent in the synthesis of bis(2-chloroethylthio) ethane.

It should be understood that the instant invention is not limited to the details of the above disclosure either as to materials or proportions, but is limited only by the scope of the claims appended thereto.

We claim:

1. In the preparation of bis (2-chloroethylthio)ethane-1,2 by the reaction of ethanedithiol and vinyl chloride at a temperature between 0° C. and 50° C. the improvement which comprises incorporating a catalytic amount of phenyl disulfide in the reaction mixture and performing the reaction while irradiating the mixture with light rays emitted by a tungsten filament lamp the rays of which have been filtered to remove infra red radiation.

2. The process of claim 1 wherein the reactants are dissolved in an inert solvent.

3. The process of claim 1 wherein the solvent is a member of the group consisting of benzene, cyclohexane, and methanol.

References Cited in the file of this patent

UNITED STATES PATENTS

| | | |
|---|---|---|
| 2,051,807 | Allen | Aug. 25, 1936 |
| 2,392,295 | Rust et al. | Jan. 1, 1946 |

OTHER REFERENCES

Chemical Reaction of Ultraviolet Rays, Ellis et al., pp. 34, 35 and 170, 1941, and pages 65–67.

Journal of Organic Chemistry, vol. 7, No. 6, pp. 472–476, November 1942.

"The Photo-Addition of Hydrogen Sulfide to Olefinic Bonds," by W. E. Vaughan and F. K. Rust.